Patented Oct. 8, 1946

2,408,905

UNITED STATES PATENT OFFICE 2,408,905

PREPARATION OF SYNTHETIC GLYCERIDES

Howard C. Black and Charles A. Overley, Chicago, Ill., assignors to Industrial Patents Corporation, Chicago, Ill., a corporation of Delaware No Drawing. Application November 29, 1941, Serial No. 420,942

9 Claims. (Cl. 260—410.6)

1

This invention relates to the preparation of chemically pure esters of polyhydroxy compounds and unsaturated acids.

One of the objects of this invention is to provide a method for the synthesis of pure esters of polyhydroxy compounds, for example, polyhydroxy alcohols, and unsaturated organic acids.

Other objects and advantages of this invention will become apparent from the description and claims which follow.

It has been found difficult to produce pure esters of unsaturated acids and polyhydroxy compounds, for example, glycerol, by direct esterification due to oxidation and polymerization of the unsaturated acids at the unsaturated bonds during the attempted synthesis. To facilitate the esterification and prevent oxidation and polymerization of the unsaturated acids during the reaction, it has been proposed to form the acid chlorides or anhydrides of the unsaturated acids before reacting the materials with the polyhydroxy compound. In forming the acid chlorides or anhydrides of the unsaturated acids, oxidation, polymerization and decomposition of the acids at the unsaturated bonds occur, and yields of pure acid chlorides or anhydrides of the unsaturated acids are low. After the pure acid chloride or anhydride has been produced, some oxidation and polymerization of the unsaturated bonds occur during the reaction of the acid chloride or anhydride with the polyhydroxy compound. The resulting synthetic esters of the polyhydroxy compound and the unsaturated acids consist of a variety of individual compounds and the product is not a pure ester of the polyhydroxy compound and the unsaturated acids.

The present invention contemplates the preparation of the acid chlorides of bromine addition products of unsaturated acids, which are then reacted with the polyhydroxy compound, and the subsequent removal of the bromine to yield the pure ester of the polyhydroxy compound and the unsaturated acids. The method of the present invention may be employed, for example, in the preparation of pure synthetic monoacid, diacid, and triacid esters of glycerin and unsaturated acids, monoacid and diacid esters of ethylene glycol, monoacid and diacid esters of diethylene glycol, and the like. This method may also be employed in preparing mixed glycerides of unsaturated acids and mixed glycerides of saturated and unsaturated fatty acids.

The method of this invention is applicable to the preparation of any ester of a polyhydroxy compound and unsaturated organic acids. Examples of monocarboxylic unsaturated acids having one unsaturated bond are the acids of the oleic acid series such as acrylic, crotonic, angelic, tiglic, methacrylic, lauroleic, myristoleic, palmitoleic, oleic, erucic, brassidic, elaidic and ricinoleic acids. Examples of monocarboxylic acids having two unsaturated bonds are the acids of the linoleic acid series, such as tariric and linoleic acids. Examples of monocarboxylic acids having three unsaturated bonds are linolenic and elaeostearic acids. Examples of dicarboxylic acids having one unsaturated bond are aconitic, itaconic, citraconic, maleic and fumaric acids.

The unsaturated acid is first brominated to protect the unsaturated bonds. The bromine addition product is then converted to an acid chloride by the use of, for example, thionyl chloride, phosphorus trichloride or phosphorus pentachloride. In the preparation of glycerides, for example, the acid chloride of the bromine addition product is then dissolved in a solvent in which glycerol or acetoneglycerol and a nitrogenous base is also soluble, such as chlorinated hydrocarbons, for example, dry chloroform, carbon tetrachloride, ethylene dichloride, and acetylene tetrachloride. The purpose of employing a solvent is to produce a single homogeneous phase of the reaction mixture. If the solvent is not employed, mixing of the reagents is difficult.

Acetoneglycerol is a condensation product formed by the reaction of glycerol and acetone in the presence of anhydrous sodium sulphate and hydrochloric acid. Two of the hydroxyl groups of the glycerol are thereby covered or removed from the sphere of reaction, leaving but one hydroxyl group free to react with the acid chloride of the bromine addition product, and the formation of the monoacid ester is thereby assured. The formation of acetoneglycerol may be represented by the following equation:

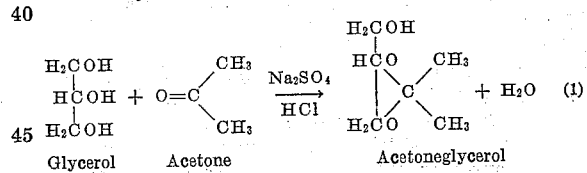

Glycerol   Acetone   Acetoneglycerol

The solution of the acid chloride of the bromine addition product is then added to a cold mixture of acetoneglycerol and quinoline, or other suitable nitrogenous base, such as pyridine, aniline, and the like. Quinoline, or other nitrogenous base is employed to react with the hydrogen chloride liberated by the reaction between the acid chloride of the bromine addition product and acetoneglycerol.

The mixture is allowed to stand for a number of hours and is then taken up in ether and washed successively several times with cold dilute sulphuric acid, saturated sodium bicarbonate solution, and water. The ether solution is dried over anhydrous sodium sulphate and is then held at a low temperature to precipitate the ester formed by the reaction between the acid chloride of the bromine addition product and acetoneglycerol. The ester may be removed by filtration and recrystallized from a mixture of equal parts of ether and petroleum ether. The ester formed by the reaction of the polyhydroxy compound and the acid chloride of the bromine addition product may be liberated from the acetone condensation product by replacing the hydroxyl groups in the glycerol or polyhydroxyl part of the reaction product or hydrolyzing the reaction product by dissolving the crystallized or precipitated material in ether and adding cold concentrated hydrochloric acid.

The mixture may be allowed to stand over night at low temperatures to crystallize the brominated ester, after which the ester may be filtered from the liquor and washed free of chlorides with cold water. The ester may then be dried in a vacuum and recrystallized from ether, if desired.

The brominated ester is then debrominated by treatment with zinc and anhydrous alcohol. Other solvents may be employed in place of alcohol, such as benzene, toluene and xylene, but we prefer to employ alcohol. The alcohol may be refluxed and the zinc removed by filtration. The filtrate is washed several times with water and finally dried over anhydrous sodium sulphate and evaporated in vacuo. The liquid is then taken up in a mixture of equal parts of ether and petroleum ether and is allowed to crystallize at reduced temperatures. The crystals of pure unsaturated esters may be removed from the liquor by filtration, and then dried.

By way of illustration, but not by way of limitation, the present method is specifically described in the preparation of monoacid, diacid, and triacid esters of glycerol and linoleic acid.

The bromine derivative of linoleic acid, namely, tetrabromostearic acid, was prepared by bromination of the acetone soluble fraction of cottonseed oil fatty acids. The acetone soluble fraction of cottonseed oil fatty acids was obtained by dissolving the mixture of fatty acids derived from cottonseed oil in about 4 volumes of acetone. The solution was then cooled to —15 degrees C. and maintained at this temperature for several hours. The precipitated acids were removed by filtration, and the acetone in the filtrate was removed by evaporation. The acids obtained by evaporation of the acetone were dissolved in dry petroleum ether and bromine added while maintaining the mass at about 20 degrees C. and continuing the bromine addition until no more bromine was absorbed. The tetrabromostearic acid separated in white crystals which were removed by filtration, and purified by recrystallization from a mixture of ether and petroleum ether. The bromine derivative of linoleic acid is 9, 10, 12, 13-tetrabromostearic acid and may be represented by the formula RCOOH.

In a specific example, 80 grams of tetrabromostearic acid was placed in a flask and heated in an oil bath to a temperature of about 120 degrees C. The flask is preferably provided with a reflux condenser, and after the acid has been melted, 15 grams of thionyl chloride was added in small proportions through the condenser over a period of about one hour to convert the tetrabromostearic acid into 9, 10, 12, 13-tetrabromostearoyl chloride which may be represented by the formula RCOCl. The mixture was then allowed to cool to room temperature and held at room temperature over night.

The oily mass was taken up in about 250 cc. of anhydrous petroleum ether and the solution was then cooled to about —26 degrees C., and held at this temperature for several hours. The tetrabromostearoyl chloride crystallized into shiny white flakes which were filtered at the low temperature and washed with cold petroleum ether until most of the excess thionyl chloride was removed. The product was then carefully dried under vacuum. If desired, the tetrabromostearoyl chloride may be recrystallized from anhydrous ether or petroleum ether. The yield of product in following the procedure set forth was 78 grams of tetrabromostearoyl chloride.

In the preparation of the monoacid ester of glycerol and linoleic acid, a cold mixture of 10 grams (0.075 mole) of acetoneglycerol and 9.6 grams (0.075 mole) of quinoline was placed in a glass stoppered flask, and 45 grams (0.073 mole) of tetrabromostearoyl chloride dissolved in 20 cc. of dry chloroform added to the cold mixture of acetoneglycerol and quinoline in small portions while cooling and agitating the mixture. The mass was then allowed to stand for about forty eight hours at room temperature.

The slight excess of acetoneglycerol is employed to insure that no free acid chloride remains in the reaction mixture. Free acid chloride will be converted into the free fatty acid when the product is taken up in ether and washed with water. The fatty acid is more difficult to separate from the ester than the acetoneglycerol. Equimolar quantities of the acid chloride and acetoneglycerol, however, may be used. A slight excess of quinoline is also employed to insure a complete removal of the hydrogen chloride formed by the reaction.

The reaction may be represented by the following equation:

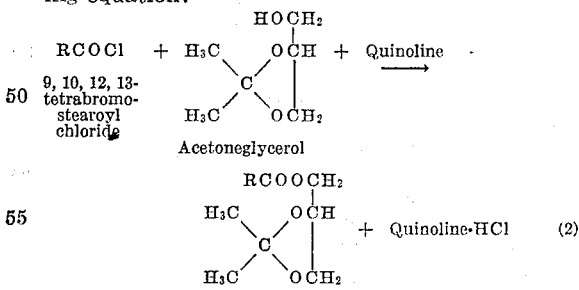

Ester of brominated acid and acetoneglycerol

The material was taken up in about 150 cc. of cold ether and washed successively several times with cold 0.5 N sulphuric acid, saturated sodium bicarbonate solution, and water. The ether solution was dried over anhydrous sodium sulphate and was then cooled to about —26 degrees C. The gummy precipitate was filtered and recrystallized from a mixture of ether and petroleum ether at a temperature of about —26 degrees C. The yield was about 35.5 grams of the ester.

The monoacid ester of glycerol and tetrabromostearic acid was liberated from the acetone condensation product by replacing the hydroxyl groups in the glycerol part of the ester or by hydrolyzing the reaction product by dissolving the recrystallized precipitate in about 300 cc. of ether, cooling the liquid in an ice bath, and adding about 300 cc. cold concentrated hydrochloric acid in portions while vigorously agitating the mass. The mixture was then cooled to about −26 degrees C., and the semicrystalline solid filtered and washed free of chlorides with cold water. The solids were then dried under vacuum and recrystallized from about 500 cc. ether at zero degrees C. The recrystallized product appeared as plates when examined under a high powered microscope. The yield was 26 grams of the monoacid ester of glycerol and tetrabromostearic acid.

The replacement of the hydroxyl groups, or the hydrolysis of the reaction product, or the liberation of the monoacid ester of glycerol and tetrabromostearic acid from the acetone condensation product may be represented as follows:

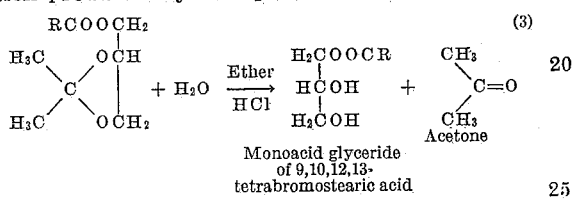

Monoacid glyceride of 9,10,12,13-tetrabromostearic acid

The monoacid ester of glycerol and tetrabromostearic acid was then debrominated to reestablish the unsaturated bonds by treating 20 gram portions of the tetrabromo derivative with 20 grams of finely granulated zinc and 50 cc. anhydrous alcohol. The granulated zinc is first thoroughly washed with dilute hydrochloric acid and then with water and carefully dried before use. After mixing the tetrabromo derivative, zinc, and anhydrous alcohol in a flask, the mixture was warmed gently in a water bath until a vigorous exothermic reaction occurred and the flask of material was then transferred to an ice bath. The flask was fitted with a reflux condenser and the alcohol refluxed for about one half hour. The zinc was then removed by filtration. The filtrate was taken up in ether and washed several times with water to remove the alcohol and any inorganic substances which may be present, and finally dried over anhydrous sodium sulphate.

The liquid was then evaporated under a vacuum, and the nearly colorless oily material was taken up in 30 cc. of a mixture of equal parts of ether and petroleum ether and cooled to about −26 degrees C. The solution was held at this temperature over night to crystallize the ester. The crystals were removed by filtration and dried at a low temperature. On raising the temperature of the dry crystalline material to about room temperature, the crystals melted to form a colorless viscous oil. The yield of monoacid ester of glycerol and linoleic acid was about 8.9 grams.

The iodine value of the synthetic monoacid ester of glycerol and linoleic acid was 142.1, whereas the calculated iodine value for the pure ester is 143.3. The saponification value of the ester was 158.5 whereas the calculated saponification value for the ester is 158.3. The melting point of the ester was determined as being 14.0–15.0 degrees C.

In the preparation of the diacid esters of glycerol and linoleic acid, α-monoiodohydrin or α-monotrytylglycerol may be used. The formation of these glycerol derivatives may be represented by the following equations:

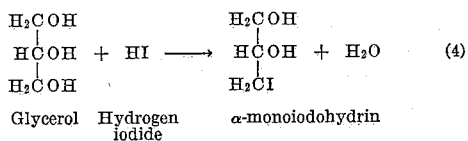

Glycerol  Hydrogen iodide  α-monoiodohydrin

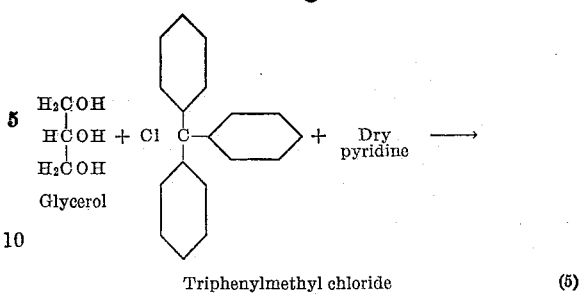

Triphenylmethyl chloride (5)

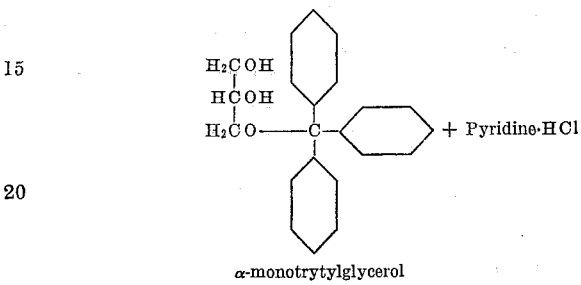

α-monotrytylglycerol

A cold mixture of the above described glycerol derivatives and quinoline in the proportion of about 1 mole of glycerol derivative to 2 moles of quinoline was placed in a glass stoppered flask and tetrabromostearoyl chloride dissolved in dry chloroform was added to the cold mixture in small proportions while cooling and agitating the mixture. The quantity of tetrabromostearoyl chloride added was slightly in excess of two moles. A slight excess of the tetrabromostearoyl chloride is employed to insure that no free hydroxyl groups remain in the glycerol derivative, and insure an esterification of both hydroxyl groups. Free acid chloride will be converted into free fatty acid when the product is taken up in ether and washed with water. The fatty acid is easier to separate from the diacid ester than the monoacid esters of glycerol which are formed when less than 2 moles of acid are used in the reaction. However, the acid chloride and the glycerol derivative may be employed in the proportion of 2 to 1, if desired. A slight excess of quinoline is preferably employed to insure a complete removal of the hydrogen chloride liberated by the reaction.

The reaction may be represented by the following equation:

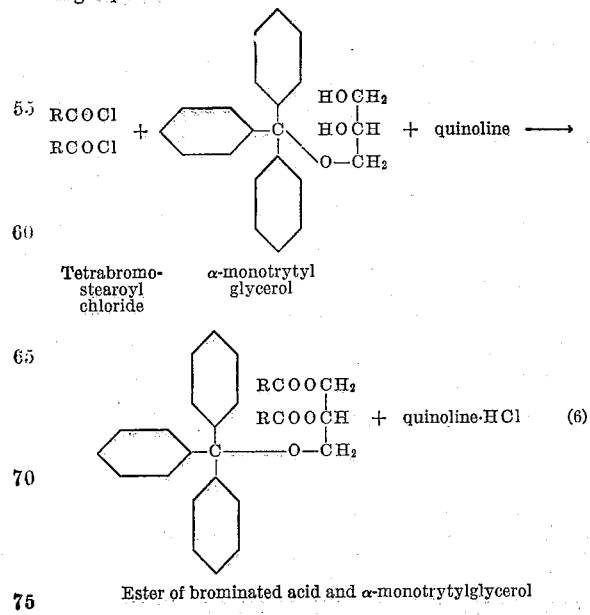

Ester of brominated acid and α-monotrytylglycerol

The reaction mass is then allowed to stand at room temperature for about 48 hours. The mass is then taken up in cold ether and washed successively several times with cold dilute sulphuric acid, saturated sodium bicarbonate solution and water. The ether solution is then dried over anhydrous sodium sulphate and cooled to about −26 degrees C. The precipitate may be filtered from the ether solution and recrystallized from a mixture of ether and petroleum ether at a temperature of about −26 degrees C.

The diacid ester of glycerol and tetrabromostearic acid may be liberated from the ester of the triphenylmethyl glycerol condensation product by dissolving the recrystallized precipitate in ether, cooling the solution in an ice bath, and adding hydrogen chloride in portions while vigorously agitating the mass. The mixture may be then cooled to and held at about −26 degrees C. and the semicrystalline ester filtered and washed free of chlorides with cold water. The ester may be then dried under vacuum and recrystallized from ether.

The liberation of the diacid ester of glycerol and tetrabromostearic acid or the replacement of the hydroxyl groups in the glycerol part of the ester may be represented as follows:

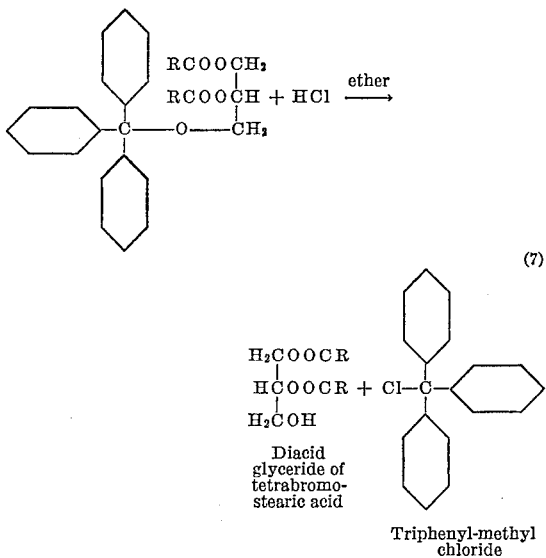

(7)

Although, in the equations above, the use of α-monotrytylglycerol has been illustrated, it is apparent that α-monoiodohydrin may be represented in a similar manner. However, in the removal of iodine from the ester of α-monoiodohydrin, the conditions are sufficiently vigorous to cause rearrangement of the acid radicals to form the α-, α-diacid glyceride. The iodine is removed by heating the iodine compound in alcohol in the presence of silver nitrite.

The diacid ester of glycerol and linoleic acid is formed by debrominating the ester of glycerol and tetrabromostearic acid, whereby the unsaturated bonds are reestablished in the acid radicals. Debromination may be effected by treating the ester of glycerol and tetrabromostearic acid with finely granulated zinc and anhydrous alcohol. After mixing the glycerol derivative, zinc and anhydrous alcohol in a flask, the mixture may be warmed gently, for example, in a water bath, until a vigorous exothermic reaction occurs and the flask is then transferred to an ice bath. The zinc may be removed by filtration and the filtrate washed several times with water and finely dried over anhydrous sodium sulphate. This procedure is sufficiently vigorous to cause the α-, β-diacid glyceride to be at least partially converted to the α-, α-diacid glyceride.

The dried filtrate may then be evaporated under a vacuum and the only residue may be taken up in a mixture of equal parts of ether and petroleum ether and cooled to about −26 degrees C. The solution may be held at this temperature over night to crystallize the diacid esters of glycerol and linoleic acid and the crystals may then be removed by filtration and dried at a low temperature. On raising the temperature of the dry crystalline material to about room temperature, the crystals melt to form a colorless viscous oil.

In the preparation of the triacid ester of glycerol and linoleic acid, in a specific example, a cold mixture of 2.2 grams (0.024 mole) glycerol and 9.6 grams (0.075 mole) quinoline was placed in a flask, and 45 grams (0.073 mole) tetrabromostearoyl chloride dissolved in 30 cc. dry chloroform was added in small portions while cooling and agitating the mixture. The semisolid mass was permitted to stand at room temperature for two days and then taken up in 600 cc. of ether. The solution was then washed successively with 0.5 N sulphuric acid, saturated sodium bicarbonate solution and water. The ether solution was then dried over anhydrous sodium sulphate and cooled to a temperature of about zero degrees C. The liquid was held at this temperature over night, and the crystals which were formed were removed by filtration and recrystallized from ether. The recrystallized material appeared to be needlelike in form under a lower power microscope and appeared to be long thin plates under high power. The yield was 30.5 grams of glycerol tritetrabromostearin.

The slight excess of acid chloride is employed in preparing triacid glycerides to insure the esterification of all hydroxyl groups of the glycerol and to insure that no monoacid or diacid glycerides remain in the product. The free fatty acid formed from the excess acid chloride when the product is taken up in ether and washed with water is separated with greater facility from the triacid glyceride than monoacid and diacid glycerides. Equimolar quantities of the acid chloride and glycerol, however, may be used. A slight excess of quinoline is employed to insure a complete removal of the hydrogen chloride formed by the reaction.

The reaction may be represented by the following equation:

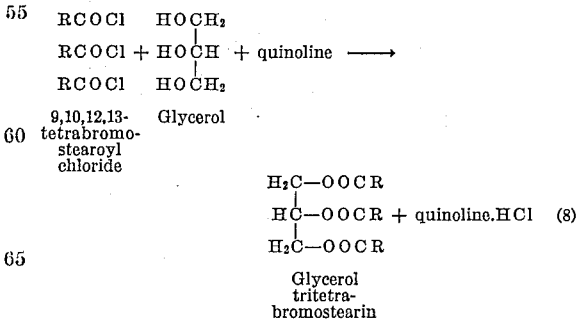

The ester was then debrominated to reestablish the unsaturated bonds by treating 20 gram lots with 20 grams of finely granulated zinc and 50 cc. anhydrous alcohol. The zinc was first washed with dilute hydrochloric acid, then with water, and carefully dried before being employed in this step. The flask was then warmed gently in a water bath until a vigorous exothermic reaction set in, and the flask was then transferred to an ice bath. The flask was fitted with a reflux condenser, and the alcohol was refluxed for about one half hour, after which the zinc was removed by filtration. The filtrate was taken up in ether and washed several times with water and finally dried over anhydrous sodium sulphate and evaporated under vacuum. On dissolving the colorless oil in a mixture of equal parts of ether and petroleum ether and holding the solution at −26 degrees C. over night, no crystals were produced. The solvent was removed by evaporation under vacuum.

The triacid ester of glycerol and linoleic acid had an iodine value of 171.2 whereas the calculated value for the ester is 173.3. The saponification value of the ester was 191.2 whereas the calculated saponification value is 191.5. The melting point of the product is 5.0–4.0 degrees C.

That the acid radical of the esters prepared by the above procedures is linoleic acid may be easily determined by saponifying the esters by treatment with 5 per cent alcoholic sodium hydroxide and isolating the fatty acid by acidification and extraction with petroleum ether. For example, 6 gram samples of the monoacid ester and the triacid ester were allowed to stand over night with 75 cc. of 5 per cent alcoholic sodium hydroxide. The fatty acids were isolated by acidification and extraction with petroleum ether. The acids so isolated may then be brominated and the tetrabromostearic acid may be identified by a melting point determination.

For example, the acids isolated from the esters as described above were brominated by taking 5 grams of the acid and brominating the acid in 80 cc. of petroleum ether at about 20 degrees C. The yield of the brominated product was 4.5 grams of crystalline material, which had a melting point of 115.5 degrees C. Similarly, 5 grams of linoleic acid obtained by debromination of the tetrabromostearic acid was brominated to yield 4.5 grams of crystalline material having a melting point of 115.5 degrees C. The tetrabromide of the acid isolated from a mixture of the monoacid and triacid esters prepared as above also had a melting point of 115.5 degrees C.

In the preparation of mixed glycerides, for example, triglycerides, containing two different acid radicals, the monoacid glyceride of an acid may first be formed and the monoacid glyceride then reacted with an acid chloride of a different acid. If desired, the diacid glyceride of an acid may first be formed and then treated with an acid chloride of a different acid to form the mixed glyceride. If desired, each of the hydroxyl groups of the glycerol may be replaced with a different acid radical.

For example, the method of the present invention may be illustrated by the preparation of a triglyceride in which one of the hydroxyl groups is replaced by linoleic acid and the other two hydroxyl groups may be replaced by linolenic acid.

The acids are first brominated to protect the unsaturated bonds. The bromine derivative of linoleic acid is 9, 10, 12, 13-tetrabromostearic acid. The bromine derivative of linolenic acid is 9, 10, 12, 13, 15, 16-hexabromostearic acid. The bromine addition products are then converted into acid chlorides, namely, 9, 10, 12, 13-tetrabromostearoyl chloride and 9, 10, 12, 13, 15, 16-hexabromostearoyl chloride, which may be represented by RCOCl, and R'COCl, respectively.

In the preparation of an ester of glycerol in which one of the hydroxyl groups is replaced by linoleic acid and the other two replaced by linolenic acid, the monoacid ester of the tetrabromostearic acid and glycerol is first prepared by reacting the tetrabromostearoyl chloride with the acetoneglycerol condensation product in the presence of a nitrogenous base such as quinoline, as represented by Equation 2.

The ester of tetrabromostearic acid and acetoneglycerol is then treated with water, ether and hydrochloric acid to liberate the monoacid ester of tetrabromostearic acid and glycerol, as illustrated in Equation 3.

The ester is then reacted with the hexabromostearoyl chloride in the presence of quinoline or other nitrogenous base to form a mixed glyceride as illustrated in the following equation:

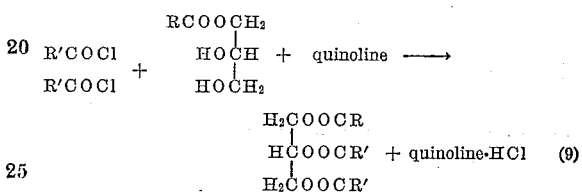

The ester of glycerol and linoleic and linolenic acids may be formed by debromination of the bromine derivative to reestablish the unsaturated bonds by treatment with finely granulated, purified zinc and anhydrous alcohol.

The reactions, crystallization and drying of the materials at the different stages in the process may be carried out as described above in the preparation of monoacid esters and triacid esters of glycerol.

It is apparent that if desired, a diacid glyceride may first be prepared by reacting the acid chloride with α-monoiodohydrin or α-monotrytylglycerol in the presence of quinoline, for example, as illustrated in Equation 6. The diacid ester of the brominated acid and the glycerol derivative is then liberated from the condensation product to form the diacid glyceride of the brominated acid. The diacid glyceride of the brominated acid is then reacted with the acid chloride of the second acid in the presence of quinoline to form the mixed triacid ester of glycerol and the two acids. The successive reactions may be illustrated by the following equations:

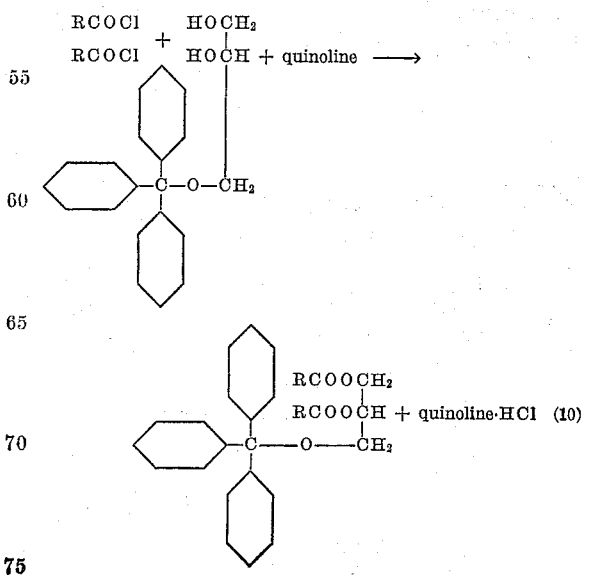

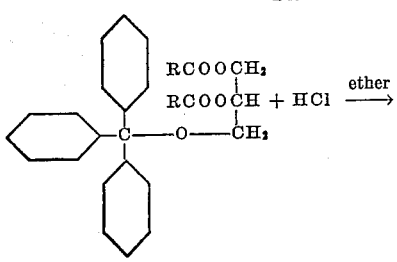

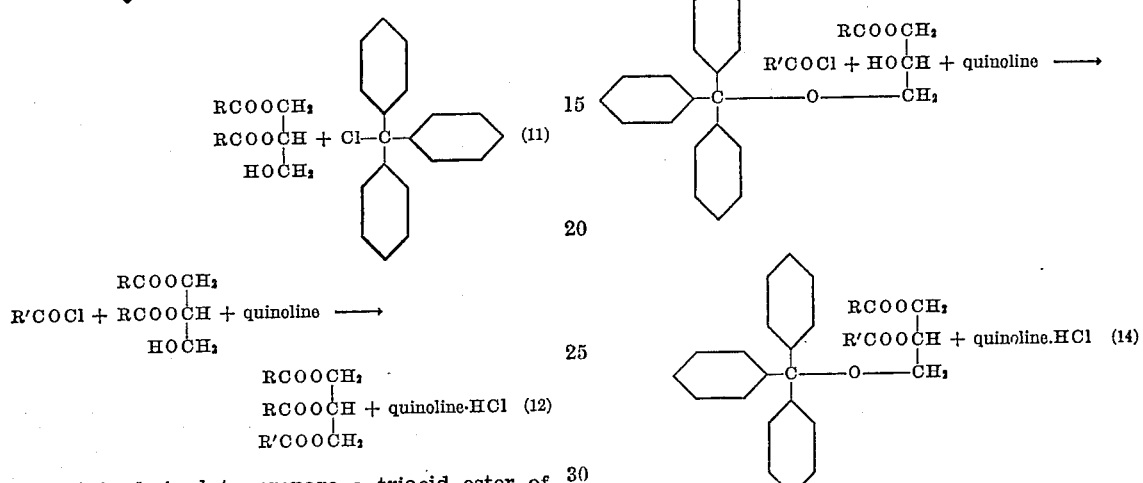

If it is desired to prepare a triacid ester of glycerol in which each of the hydroxyl groups of the glycerol are replaced by a different acid radical, the unsaturated acids are first brominated to protect the unsaturated bonds. The brominated acids are then converted to acid chlorides. It is apparent that if one of the hydroxyl groups is to be replaced by a saturated acid, the acid need not be brominated before converting it into the acid chloride. The acid chlorides may be represented by RCOCL, R′COCL and R″COCL.

In the preparation of the glycerol ester, a monoacid ester is first prepared by reacting the brominated acid chloride with acetoneglycerol in the presence of quinoline. The ester of the brominated acid and acetoneglycerol condensation product is then converted to the monoacid ester of the brominated acid and glycerol. These reactions are represented by Equations 2 and 3.

The monoacid ester is then reacted with triphenylmethyl chloride to protect one of the hydroxyl groups of the glycerol part of the monoacid ester, as illustrated by the following equation:

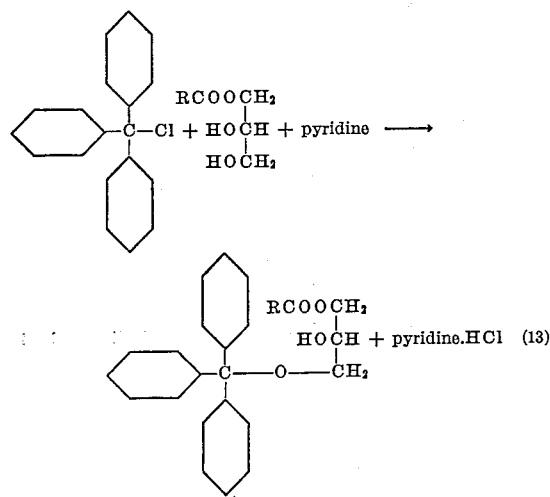

The resulting product is then reacted with the acid chloride of the second brominated acid and the resulting ester then converted to the diacid ester of glycerol and the two brominated acids, as represented by the Equations 14 and 15. In the conversion to the ester of glycerol, the reaction may be sufficiently vigorous to cause at least a portion of the α-, β-diacid glyceride to be converted to the α-, α-diacid glyceride.

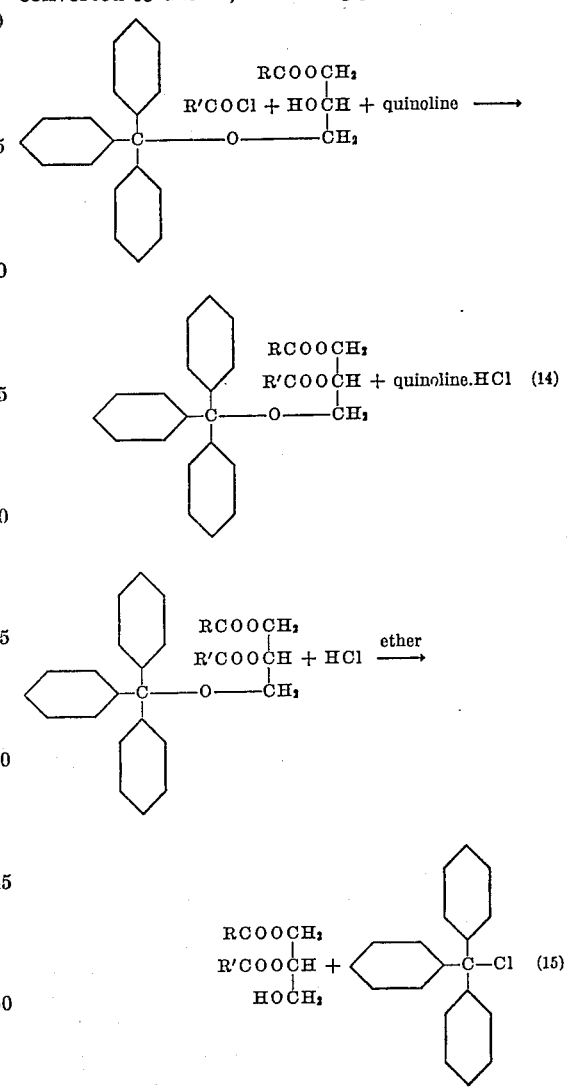

The diacid ester is then reacted with the acid chloride of the third acid to form a triacid ester of glycerol in which each of the hydroxyl groups of the glycerol molecule are replaced by different acid radicals. This reaction may be represented by the following equation:

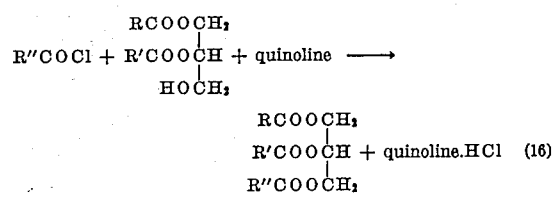

The purification of the various products and the conversion of the esters of the acids and the glycerol derivatives into the esters of the acids and glycerol are carried out in the same manner as described hereinbefore with respect to the preparation of monoacid, diacid, and triacid esters of glycerol.

Diacid esters of ethylene glycol and diethylene glycol may be prepared in a similar manner. For example, the glycol and quinoline may be dissolved in chloroform and the acid chloride added to the solution in small proportions. The reaction mixture is cooled continuously and agitated until all of the acid chloride has been added. The reagents are employed in the ratio of one part of the glycol to two parts of the acid chloride to two parts of quinoline or pyridine. As pointed out in connection with the preparation of glycerides, we prefer to employ slightly more than two parts of acid chloride and the nitrogenous base, such as quinoline or pyridine, to insure a complete esterification of the hydroxyl groups of the glycol and to insure a complete removal of the hydrogen chloride from the reaction mixture. The mass is then allowed to stand for about 48 hours at about room temperature.

The esters may then be taken up in cold ether and washed several times consecutively with cold dilute sulphuric acid, saturated sodium bicarbonate solution and water. The ether solution may then be dried over anhydrous sodium sulphate and cooled to permit crystallization of the esters.

If the acid employed in forming the diacid esters is an unsaturated acid, it is obvious that the unsaturated bonds are first protected by bromination. The acid chloride is then formed, which is employed in the reaction with the ethylene glycol. If a saturated acid is to be employed in the reaction with the glycol, the acid chloride of the acid is first formed and the acid chloride reacted with the glycol. If the bromine addition product of an unsaturated acid has been used, the crystallized ester of ethylene glycol and the bromine addition product of the acid is then debrominated by treatment with finely granulated zinc and alcohol to form the esters of ethylene glycol and the unsaturated acids.

Esters of other polyhydroxy compounds may also be prepared in accordance with the present invention. An example of a further class of polyhydroxy compounds is the sugars. Esters of monosaccharides, for example, galactose, glucose, fructose and mannose, and disaccharides, for example, sucrose, maltose, and lactose, may be prepared in a manner similar to that described above. The sugar or sugar derivative is mixed with quinoline or pyridine in a suitable solvent and the acid chloride then added. It is obvious that the molecular proportions of pyridine and the acid chloride with respect to the sugar must be in an appropriate relation to effect the desired esterification of the sugar. Certain of the hydroxyl groups of the sugar may be protected or removed temporarily by reaction with a ketonic compound, for example, acetone or benzaldehyde. For example, two adjacent hydroxyl groups of the glucose may be protected by reaction with acetone in a manner similar to the reaction between glycerol and acetone as set forth in Equation 1. Certain of the hydroxyl groups may be protected by reaction with triphenylmethylchloride in a manner similar to that employed in the preparation of diacid glycerides.

The reaction mass formed by reaction of the sugar derivative and the acid chloride of the bromine addition product is then allowed to stand for one or two days after which the mass is taken up in cold ether and washed consecutively with cold sulphuric acid, saturated sodium bicarbonate solution and water. The ether solution may then be dried and cooled and the mixture allowed to crystallize. The ester of the sugar and the bromine addition product of the acid, if an unsaturated acid is employed, or the ester of the sugar and the saturated acid may be liberated from the condensation product, if a derivative of the sugar has been employed, in a manner similar to that described above with respect to the preparation of esters of glycerol. If a bromine addition product was employed as the starting acid radical, the esters may be debrominated to reestablish the unsaturated bonds by the use of, for example, alcohol, as described above, to form the ester of the sugar and the unsaturated acid.

It is apparent that the method of the present invention permits of the preparation of esters of polyhydroxy compounds and unsaturated acids with a minimum of impurities since the unsaturated bonds of the acids are protected from polymerization, oxidation, and other types of reactions during the preparation of the esters. After the esters of the polyhydroxy compounds and the bromine addition product of the acid have been formed, the unsaturated bonds in the acid radical may be reestablished or restored as the final step in the preparation of the esters. When the debromination is carried out in a neutral alcoholic solution, there is no evidence of interesterification. However, when hydrochloric acid or free hydrogen chloride is present, small amounts of esters, such as ethyl linoleate, may be formed. Solvents other than alcohol which are satisfactory for the purposes of this invention include benzene, toluene and xylene.

We have described the use of bromine in converting the unsaturated acids to saturated acids, however, it is apparent that other substances may be employed. For example, iodine may be employed, but the reaction is not as practical as that which occurs when bromine is employed. The various intermediate products, such as the halogenated acids, and esters, are not as readily separated from the reaction mixtures by crystallization as the products prepared by the use of bromine.

The use of chlorine also is not as practical as the use of bromine. When chlorine is employed in preparing the saturated acids, there is a tendency and some danger that the chlorine will replace some of the hydrogen atoms along the carbon chain. If such substitution or replacement occurs, there is a tendency for hydrogen and chlorine atoms on adjacent carbon atoms to split out to form hydrogen chloride and produce an unsaturated bond where there had been previously a saturated bond. Furthermore, if the replacement or substitution occurs at adjacent carbon atoms, and if the substituted chlorine remains linked to the adjacent carbon atoms throughout the various reactions, the final reestablishment of the unsaturated bonds in the final product by removal of the chlorine will result in the establishment of new unsaturated bonds in the acid radical portion of the ester.

In the preparation of various esters, it is not necessary that the acid chlorides be employed. For example, triacid glycerides and diacid glycols may be prepared by reaction of glycerol or glycol with the bromine addition product of the unsaturated acids.

We claim:

1. The method of preparing esters of polyhydroxy compounds and unsaturated higher fatty acids which comprises saturating the unsaturated bonds of an unsaturated higher fatty acid by halogenation to form a saturated higher fatty acid, converting the acid so saturated into an acid chloride, reacting the acyl derivative with at least one hydroxyl group of a polyhydroxy compound to form an ester and thereafter dehalogenating the acid radical portion of the ester to reestablish the unsaturated bonds.

2. The method of preparing esters of polyhydroxy compounds and aliphatic unsaturated higher fatty acids which comprises reacting the acid chloride of a bromine addition product of an aliphatic unsaturated higher fatty acid with at least one hydroxyl group of a polyhydroxy compound to form an ester, and thereafter debrominating the ester.

3. The method of preparing esters of glycerol and aliphatic unsaturated higher fatty acids which comprises halogenating the unsaturated bonds of an aliphatic unsaturated higher fatty acid, converting the acid so saturated into an acid chloride, reacting the acid chloride with at least one hydroxyl group of the glycerol to form an ester, and thereafter dehalogenating the acid radical portion of the glycerol ester to reestablish the unsaturated bonds.

4. The method of preparing monoacid esters of polyhydroxy compounds and aliphatic unsaturated higher fatty acids which comprises reacting the acid chloride of a bromine addition product of an aliphatic unsaturated higher fatty acid with a derivative of a polyhydroxy compound having only one reactable hydroxyl group and at least one unesterifiable group replacing at least a part of a hydroxyl group to esterify the reactable hydroxyl group, hydrolyzing the reaction product to reestablish all of the hydroxyl groups in the polyhydroxy compound portion of the product except the esterified group, and debrominating the resulting product.

5. The method of preparing esters of polyhydroxy compounds and unsaturated higher fatty acids, which comprises saturating the unsaturated bonds of unsaturated higher fatty acid by halogenation to form a saturated acid, converting the acid so saturated into an acid chloride, reacting the acyl derivative with at least one hydroxyl group of a polyhydroxy compound in a mutual solvent to form an ester and thereafter dehalogenating the acid radical portion of the ester to reestablish the unsaturated bonds.

6. The method of preparing esters of polyhydroxy compounds and unsaturated higher fatty acids, which comprises halogenating the unsaturated bonds of an unsaturated higher fatty acid, converting the acid so saturated into an acid chloride, reacting the acyl derivative with a derivative of a polyhydroxy compound having at least one reactable hydroxyl group and at least one unesterifiable group replacing at least a part of a hydroxyl group to esterify the reactable hydroxyl group, hydrolyzing the reaction product to reestablish all of the hydroxyl groups in the polyhydroxy compound portion of the product except the esterified group or groups and dehalogenating the acid radical portion of the reaction product to reestablish the unsaturated bonds.

7. The method according to claim 4 in which the derivative of the polyhydroxy compound having one reactable hydroxyl group is acetoneglycerol.

8. The method of preparing triacid esters of polyhydroxy compounds and aliphatic unsaturated higher fatty acids which comprises reacting the acid chloride of a bromine addition product of an unsaturated higher fatty acid with a derivative of a polyhydroxy compound having three reactable hydroxyl groups to esterify said three hydroxyl groups and then debrominating the resulting ester.

9. The method according to claim 8 in which the polyhydroxy compound is glycerol.

HOWARD C. BLACK.
CHARLES A. OVERLEY.